(12) United States Patent
Becker et al.

(10) Patent No.: US 10,797,482 B2
(45) Date of Patent: Oct. 6, 2020

(54) ACTIVE LIMITING CIRCUIT FOR INTRINSICALLY SAFE EQUIPMENT

(71) Applicant: NATIONAL OILWELL VARCO, L.P., Houston, TX (US)

(72) Inventors: Matthew David Becker, Newport Beach, CA (US); Andrew McBain, Tallahassee, FL (US)

(73) Assignee: National Oilwell Varco, L.P., Houston, TX (US)

( * ) Notice: Subject to any disclaimer, the term of this patent is extended or adjusted under 35 U.S.C. 154(b) by 423 days.

(21) Appl. No.: 15/665,021

(22) Filed: Jul. 31, 2017

(65) Prior Publication Data

US 2019/0036330 A1 Jan. 31, 2019

(51) Int. Cl.
  *H02H 9/04* (2006.01)
  *H02H 3/38* (2006.01)
  *H02H 9/00* (2006.01)
  *H02H 9/02* (2006.01)

(52) U.S. Cl.
  CPC ............ *H02H 9/04* (2013.01); *H02H 3/385* (2013.01); *H02H 9/008* (2013.01); *H02H 9/025* (2013.01); *H02H 9/042* (2013.01)

(58) Field of Classification Search
  CPC .......... H02H 3/385; H02H 9/04; H02H 9/008; H02H 9/025; H02H 9/042
  USPC ....................................................... 361/91.2
  See application file for complete search history.

(56) References Cited

U.S. PATENT DOCUMENTS

| 4,638,396 | A | 1/1987 | Mukli et al. |
| 4,698,740 | A * | 10/1987 | Rodgers .............. H02M 3/1563 323/223 |
| 5,087,870 | A | 2/1992 | Salesky et al. |
| 8,848,332 | B2 * | 9/2014 | Schmidt ................. H02H 9/008 361/111 |
| 9,271,378 | B2 * | 2/2016 | Pellat-Finet .............. F21L 4/00 |
| 2006/0181156 | A1 * | 8/2006 | Titschert ............... H02H 9/008 307/130 |
| 2007/0109773 | A1 * | 5/2007 | Meckler .................. F21S 6/008 362/157 |
| 2008/0247105 | A1 * | 10/2008 | Divan .................... H02H 3/207 361/56 |
| 2011/0045323 | A1 * | 2/2011 | Ooi ..................... H01M 2/1066 429/50 |
| 2013/0329327 | A1 * | 12/2013 | Zara ....................... H02H 3/207 361/86 |

(Continued)

OTHER PUBLICATIONS

International Patent Application No. PCT/US2018/044267 International Search Report and Written Opinion dated Nov. 6, 2018 (16 pages).

*Primary Examiner* — Kevin J Comber
(74) *Attorney, Agent, or Firm* — Conley Rose, P.C.

(57) ABSTRACT

An active limiting switch includes a comparator and a power switch. The comparator is configured to compare a reference voltage with a sense voltage. The sense voltage is representative of a proportional approximation to power in a load being driven by a battery. The power switch is configured to be, in response to the reference voltage being less than the sense voltage, in an open state. The power switch is also configured to be, in response to the reference voltage being greater than the sense voltage, in a closed state creating a closed circuit between the battery and the load allowing the battery to provide a first amount of power to the load.

20 Claims, 4 Drawing Sheets

(56) References Cited

U.S. PATENT DOCUMENTS

2015/0028935 A1* 1/2015 Pantano ............... H02H 1/0092
327/419

* cited by examiner

ACTIVE LIMITING CIRCUIT FOR INTRINSICALLY SAFE EQUIPMENT

BACKGROUND

Many electrical products utilized in oilfield equipment and other equipment must be hazardous area certified. In other words, these electrical products must be certified to work in a hazardous gas atmosphere without igniting the atmosphere. There are several protection methods for achieving hazardous area certification. One method is intrinsic safety. When utilizing intrinsic safety, the electrical energy and power of any given circuit is limited to a level that is below the threshold level of energy/power required to ignite the hazardous gas atmosphere in which it operates. Because there are different hazardous gas groups with different ignition properties, different hazardous areas may allow for different levels of electrical energy to be present and still achieve intrinsic safety. Similarly, the amount of power allowed in a particular hazardous area is dependent on the temperature code of the application as well as the design of the circuit itself.

SUMMARY OF THE DISCLOSURE

The problems noted above are solved in large part by systems and methods for limiting power to a load. In some embodiments, an active limiting switch includes a comparator and a power switch. The comparator is configured to compare a reference voltage with a sense voltage. The sense voltage is representative of a proportional approximation to power in a load being driven by a battery. The power switch is configured to be, in response to the reference voltage being less than the sense voltage, in an open state. The power switch is also configured to be, in response to the reference voltage being greater than the sense voltage, in a closed state creating a closed circuit between the battery and the load allowing the battery to provide a first amount of power to the load.

Another illustrative embodiment is a system that includes a power source, a load, a first active limiting circuit coupled to the power source and the load, and a first power switch. The power source is configured to generate a signal at a first power level based on an output voltage and an output current of the power source. The load is configured to receive the signal. The first active limiting circuit includes a first comparator configured to compare a first reference voltage with a first sense voltage. The first sense voltage is representative of the first power level in the signal generated by the power source. The first power switch is configured to be, in response to the first reference voltage being less than the first sense voltage, in an open state preventing the power source from providing the signal at the first power level to the load. The first power switch is further configured to be, in response to the first reference voltage being greater than the first sense voltage, in a closed state creating a closed circuit between the power source and the load allowing the power source to provide the signal at the first power level to the load.

Yet another illustrative embodiment is a method for limiting power to a load. The method includes receiving a signal from a power source. The signal has a first power level based on an output voltage and an output current in the signal. The method also includes generating a sense voltage representative of the power level of the signal. The method also includes comparing the sense voltage with a reference voltage associated with a desired power output threshold. In response to the reference voltage being less than the sense voltage, the method also includes driving a gate of a power switch with a LOW voltage signal to open the power switch preventing the power source from providing the signal to a load at the first power level. In response to the reference voltage being greater than the sense voltage, the method also includes driving the gate of the power switch with a HIGH voltage signal to close the power switch allowing the power source to provide the signal to the load at the first power level.

BRIEF DESCRIPTION OF THE DRAWINGS

For a detailed description of various examples, reference will now be made to the accompanying drawings in which.

NOTATION AND NOMENCLATURE

Certain terms are used throughout the following description and claims to refer to particular system components. As one skilled in the art will appreciate, entities and/or individuals may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections. The recitation "based on" is intended to mean "based at least in part on." Therefore, if X is based on Y, X may be based on Y and any number of other factors.

DETAILED DESCRIPTION OF DISCLOSED EXEMPLARY EMBODIMENTS

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As discussed above, many electrical products must be hazardous area certified for use in a hazardous gas atmosphere. One way to achieve a hazardous area certification is to make the electronic product intrinsically safe. Thus, the electrical energy and power of any given circuit in the equipment is limited to a level that is below the threshold level of energy/power required to ignite the hazardous gas atmosphere. Because there are different hazardous gas groups with different ignition properties, different hazardous areas may allow for different levels of electrical energy to be present and still achieve intrinsic safety. Similarly, the amount of power allowed in a particular hazardous area is dependent on the temperature code of the application as well as the design of the circuit itself. In conventional intrinsic safety circuitry design, a circuit is limited using "passive" components such as current-limiting resistors, fuses, and Zener diodes. The passive components of these types of conventional intrinsic safety circuits consume a relatively large amount of power and/or create undesirable voltage drops. This leads to inefficiency which, when the power source is one or more batteries, can reduce the battery life considerably and generally degrade the performance of the system. Therefore, there is a need to develop an intrinsically safe circuit without the classical use of passive components. In accordance with various examples, an active limiting circuit is described which measures the voltage/current/power output from a power source and disconnects the power source from a load if any of those parameters or combination of parameters becomes unsafe for the particular atmosphere where the load is located.

Figure 1:
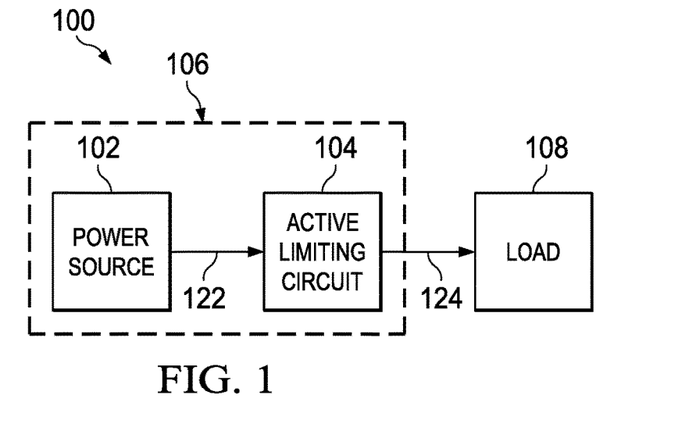
FIG. 1 shows an illustrative block diagram of a power providing system in accordance with various embodiments.

FIG. 1 shows an illustrative block diagram of a power providing system 100 in accordance with various embodiments. The power providing system 100 may include a power providing circuit 106 and a load 108. The power providing circuit 106 is configured to provide power to the load 108. However, if the power being provided exceeds a threshold level, which in some embodiments, is set to a level that is below the power required to ignite a hazardous gas atmosphere in which the load 108 is located, the power providing circuit 106 is configured to disconnect the power from reaching the load 108, thus preventing ignition of the hazardous gas atmosphere. The load 108 may be any type of electrical load that receives power from the power providing circuit 106. In one example, the load 108 may be a radio node with one or more transceivers, one or more MEMS low power sensors, temperature sensors, etc., and/or any combination thereof. Thus, the load 108, in an embodiment, may be a modular data acquisition system that monitors downhole tools in a wellbore and is powered by the power providing circuit 106.

The power providing circuit 106 may include a power source 102 and an active limiting circuit system 104. The power source 102 may be any type of power source that supplies electric energy to drive the load 108. For example, the power source 102 may be a DC power supply, an AC-to-DC power supply, a switched-mode power supply, a programmable power supply, etc. Thus, in an embodiment, the power source 102 is one or more batteries (e.g., two D cell batteries) that provide the electrical energy to the load 108.

The active limiting circuit system 104 receives signal 122 (i.e., the electrical energy) from power source 102. In some embodiments, the active limiting circuit system 104 is a circuit implemented on a printed circuit board (PCB) which is connected to the power source 102. Once the active limiting circuit system 104 receives the signal 122 from the power source 102, a comparison is made between the power in the signal 124 (the output signal of the active limiting circuit 104 that may be provided to load 108) with a threshold power level. If the power in the signal 124 is less than the threshold power level, the power supplied in the signal 124 is provided to the load 108. However, if the power in the signal 124 is greater than the threshold power level, the power supplied in the signal 124 is disconnected from the load 108. As discussed above, the threshold power level may be set to a level that is below the power required to ignite a hazardous gas atmosphere in which the load 108 is located. Thus, protection is provided against potential gas ignition.

Figure 2:
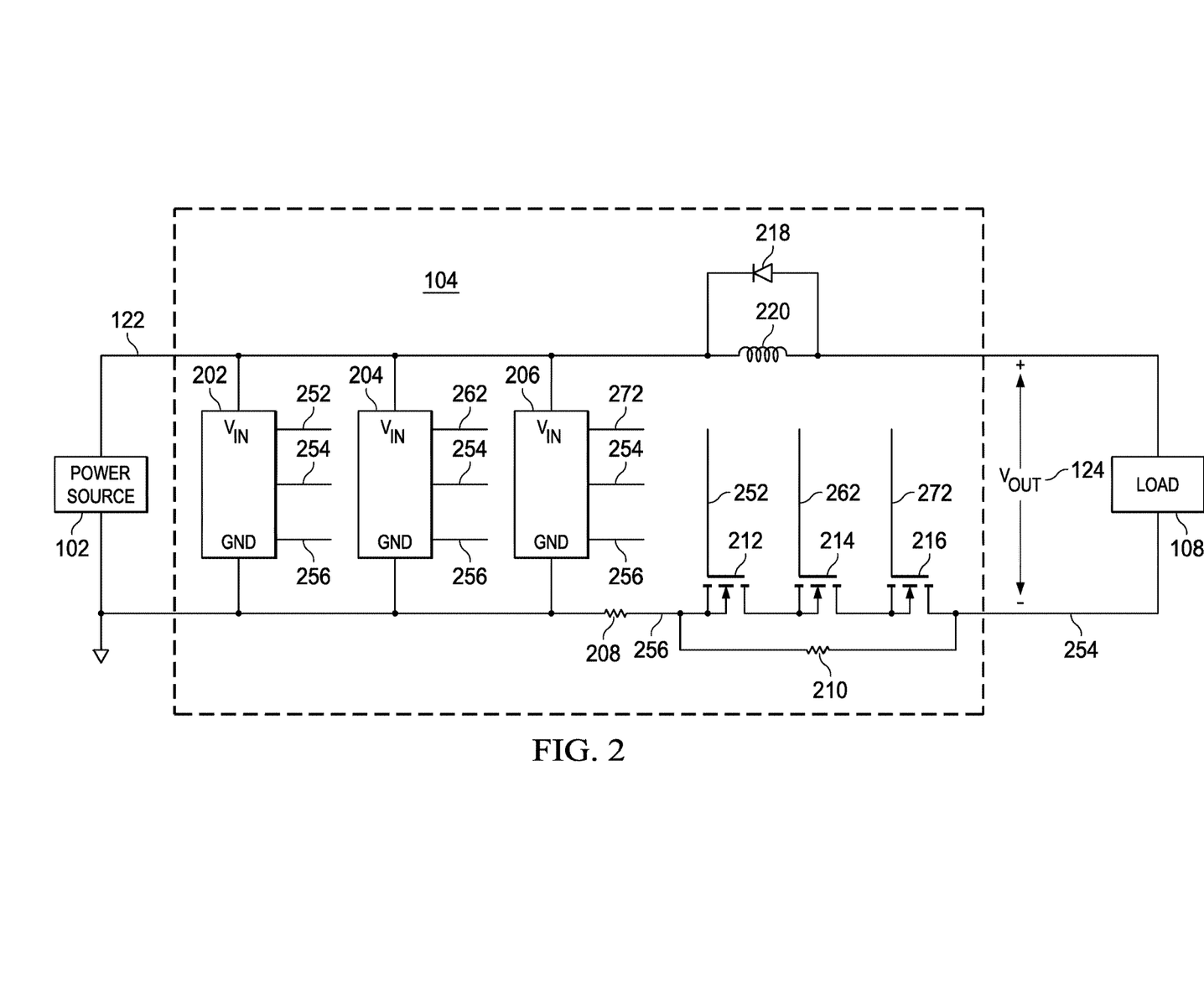
FIG. 2 shows an illustrative circuit diagram of an active limiting circuit system in accordance with various embodiments.

FIG. 2 shows an illustrative circuit diagram of an active limiting circuit system 104 in accordance with various embodiments. The active limiting circuit system 104 may include active limiting circuits 202-206, power switches 212-216, a sense resistor 208, a bypass resistor 210, an inductor 220, and a diode 218. In some embodiments, the power switches 212-216 are n-channel metal-oxide semiconductor (NMOS) enhancement type transistors. In alternative embodiments, the power switches may be any other type of switch including a p-channel metal-oxide-semiconductor field-effect (PMOS) transistor, a p-type junction gate field-effect transistor (PJFET), a n-type junction gate field-effect transistor (NJFET), and a bipolar junction transistor (BJT) (including PNP and NPN transistors). As discussed above, the active limiting circuit system 104 is configured to compare the power supplied by signal 122 to a threshold power level and disconnect from the load 108 the power supplied by signal 122 if the power supplied by the signal 122 is greater than the threshold power level.

Each of the active limiting circuits 202-206 is configured to compare a reference voltage which corresponds with the threshold power level with a sense voltage which is representative of a proportional approximation to the power supplied by signal 122 to the load 108 to generate a gate voltage 252, 262, 272 respectively. For example, the active limiting circuit 202 is configured to compare a reference voltage corresponding to a desired threshold power level with a sense voltage representative of the proportional approximation of the power supplied by signal 122 to the load 108. In response to the reference voltage being greater than the sense voltage, the active limiting circuit 202 generates a HIGH gate voltage 252 to drive the gate of the power switch 212. A HIGH gate voltage 252 causes the power switch 212 to close and/or remain closed (i.e., to be in a closed state). However, in response to the reference voltage being less than the sense voltage, the active limiting circuit 202 generates a LOW gate voltage 252 to drive the gate of the power switch 212. A LOW gate voltage 252 causes the power switch 212 to open and/or remain open (i.e., to be in an open state). Active limiting circuits 204, 206 act in a similar manner to generate the gate voltage 262, 272, respectively, to drive the gate of power switches 214, 216, respectively.

The sense voltage, as discussed above, is representative of the proportional approximation of the power supplied by the signal 122 to the load 108. The sense voltage may be proportional to a beta voltage 256 and active limiting circuit output voltage 254. The beta voltage 256 may be equal to $\beta * I_{out}$, where $\beta$ is the value of the sense resistor 208 (e.g., in ohms) and $I_{out}$ is the output current of the power source 102 (e.g., the current in the signal 122). The sense resistor 208 may, in some embodiments, have a relatively small value of resistance. The active limiting circuit output voltage 254, in some embodiments is equal in value to the voltage provided by the power source 102 in signal 122.

If all of the power switches 212-216 are in a closed state (i.e., each of the gate voltages 252, 262, and 272 are HIGH), then a closed circuit is created between the power source 102 and the load 108 allowing the power source 102 to provide the power supplied by the signal 122 to the load 108. If any one or more of the power switches 212-216 is in an open state, then an open circuit may be created between the power source 102 and the load 108, thus, disconnecting the power provided by the signal 122 from the load 108.

By having more than one active limiting circuit, the active limiting circuit system 104 provides redundancy and additional safety. Some hazardous area gas atmosphere certifications may require triple redundancy to account for countable faults that are assumed to be present in a design. For example, for Zone 0 atmospheres (i.e., an atmosphere with the consistent presence of hazardous gas), two countable faults are assumed by the certification agency. Therefore, having the active limiting circuits 202-206 allows the system 100 to provide triple redundancy, providing additional safety to the circuit and allowing the system to achieve certification even with an assumed two countable faults. Because different atmospheres may require more or less redundancy, depending on how hazardous the atmosphere is, any number of active limiting circuits 202-206 may be provided (e.g., 1 or more active limiting circuits).

In some embodiments, a bypass resistor 210 is provided in parallel with the power switches 212-216. In such an embodiment, the active limiting circuit system 104 operates in the same manner as discussed above when all of the power switches 212-216 are in a closed state. However, when any one or more of the power switches 212-216 are in an open state, power does flow from the power source 102 through the bypass resistor 210 to provide at least some power to the load 108. In the absence of a load, the bypass resistor 210 pulls the voltage across the power switches 212-216 drain and source to 0V allowing the power providing circuit 106 to enter into a state where it can provide power to the load 108. If any one or more of the power switches 212-216 opens due to a transient condition or other reason, the bypass resistor 210 allows a small amount of current to power a microcontroller in the load 108 to start up and enable operation of the power providing system 100. Thus, the bypass resistor 210 may be a relatively large resistor, such that it creates a relatively large voltage drop. Therefore, the current, and thus, the power that flows through the bypass resistor 210 into the load 108 may be relatively small, and at least less than the amount of power provided by signal 122. In fact, the amount of current that flows through the bypass resistor 210 may, in some embodiments, be limited to 15 mA or less which is well below the current required to ignite almost any dangerous atmosphere.

The inductor 220, which may be in parallel with the diode 218, may, in some embodiments, rate-limit the current in the signal that is provided to the load 108. Once a transient occurs, because the inductor 220 rate-limits the current to the load 108, the active limiting circuit and power-switches are provided enough time to open and disconnect the load before too much energy reaches the load and potentially ignites the dangerous atmosphere. The diode 218 may suppress any kickback that may be caused by an inductive load, so that any voltage spike is limited when the load 108 is disconnected from the power supplied by the power source 102.

Figure 3:
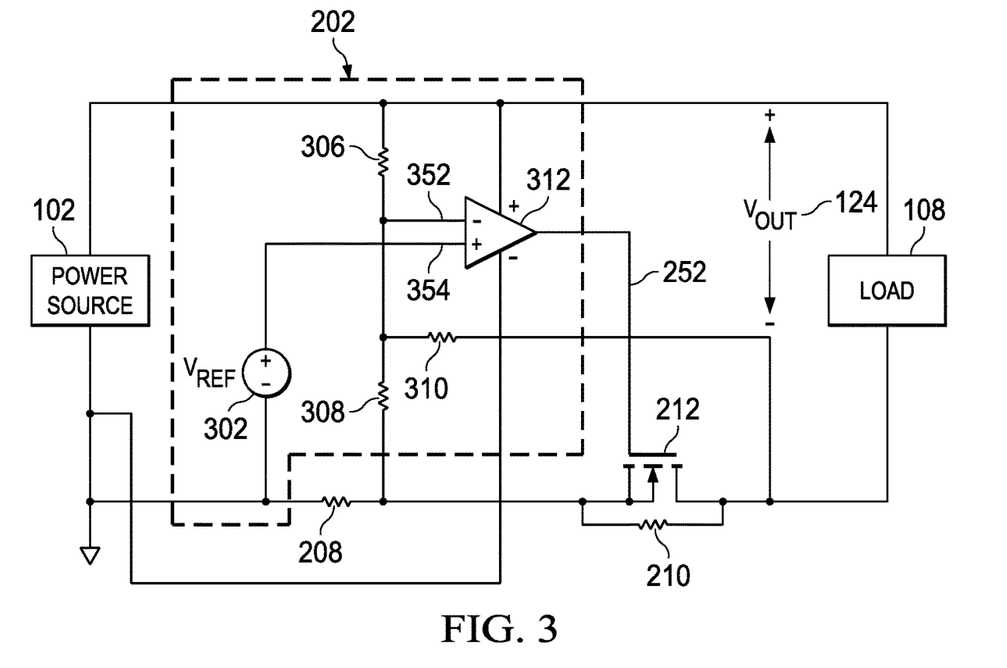
FIG. 3 shows an illustrative circuit diagram of an active limiting circuit system in accordance with various embodiments.

FIG. 3 shows an illustrative circuit diagram of active limiting circuit system 104 in accordance with various embodiments. The active limiting circuit system 104 shown in FIG. 3 includes a circuit diagram depicting active limiting circuit 202 and its associated power switch 212. However, as discussed above, active limiting circuits 204-206 and power switches 214-216 may also be included.

The active limiting circuit 202 may include a reference voltage 302, a feedback voltage divider that may include resistors 306-308 and hysteresis resistor 310, and a comparator 312. The feedback voltage divider receives the signal 124 and generates a sense voltage 352 based on the power in the signal 124. In other words, the feedback voltage divider is configured to generate the sense voltage 352 based on the output voltage of the power source 102 and the output current of power source 102. The sense voltage 352, which due to the design of the feedback voltage divider may be defined as follows:

$$V_{sense} = \alpha * V_{out} + \beta * I_{out}$$

$$\alpha = \frac{R_{308}\|R_{310}}{R_{308}\|R_{310} + R_{306}}$$

where, $V_{out}$ is the voltage of the power source 102 (e.g., the voltage in the signal 124 which may be provided to load 108), β is a value of the sense resistor 208, $I_{out}$ is the current of the power source 102 (e.g., the current in the signal 124 that may be provided to load 108), $R_{308}$ is the value of the resistor 308 (e.g., in ohms), $R_{310}$ is the value of the hysteresis resistor 310 (e.g., in ohms), and $R_{306}$ is the value of the resistor 306 (e.g., in ohms). In other words, the sense voltage 352 may be equal to α*$V_{out}$+β*$I_{out}$, where α is equal to a ratio between a value of the hysteresis resistor 310 in parallel with a value of resistor 308 and the value of the hysteresis resistor 310 in parallel with the value of the resistor 308 added to the value of the resistor 306, $V_{out}$ is the voltage of the power source 102 (e.g., the voltage in the signal 124), β is a value of the sense resistor 208, and $I_{out}$ is the current of the power source 102 (e.g., the current in the signal 124). Thus, the sense voltage 352 may be a linear combination of the output voltage and output current of the power source 102 which gives a linear approximation of the power value going to the load 108.

The comparator 312 is configured to compare the value of the sense voltage 352 with the value of the reference voltage 302. The reference voltage 302 and the values of the resistors in the feedback voltage divider (i.e., resistors 306-308 and hysteresis resistor 310) may be selected based on a desired output threshold and a range of operation for the power supply 102. The result is a circuit that has an output power threshold that is nearly constant over the working power source 102 voltage. As discussed above, the desired output threshold may be set to a level that is below the power required to ignite a hazardous gas atmosphere in which the load 108 is located. Therefore, the reference voltage 302 may be set to a voltage level that, when exceeded, may cause an ignition of the hazardous gas atmosphere in which the load 108 is located. In alternative embodiments, the reference voltage 302 may be set to a voltage level that is a percentage (less than 100%) of the value that when exceeded may cause an ignition of the hazardous gas atmosphere, thus, providing extra safety. The resistors in the feedback voltage divider may, in some embodiments, be relatively large in resistance compared to the sense resistor 302 to prevent and/or limit current drain.

In response to the reference voltage 302 being greater than the sense voltage 352, the comparator 312 is configured to drive the gate of the power switch 212 with a HIGH gate voltage signal 252 causing the power switch to close and/or remain closed (i.e., be in a closed state). However, in response to the reference voltage 302 being less than the sense voltage 352, the comparator 312 is configured to drive the gate of the power switch 212 with a LOW gate voltage signal 252 causing the power switch to open (i.e., be in an open state). The hysteresis resistor 310 may provide hysteresis to the power switch 212 such that the power switch 212 stays latched open. As discussed above, this may provide intrinsic safety for the load 108 working in a hazardous gas atmosphere.

In an alternative embodiment, in response to the reference voltage 302 being greater than the sense voltage 352, the comparator 312 may be configured to generate a LOW signal. An inverter (not shown), then may be added to drive the gate of the power switch 212 with a HIGH gate voltage signal 252 causing the power switch to close and/or remain closed (i.e., be in a closed state). However, in this embodiment, in response to the reference voltage 302 being less than the sense voltage 352, the comparator 312 is configured to generate a HIGH signal. The inverter then may cause the signal to go LOW and drive the gate of the power switch 212 with a LOW gate voltage signal 252 causing the power switch to open (i.e., be in an open state).

Figure 4:
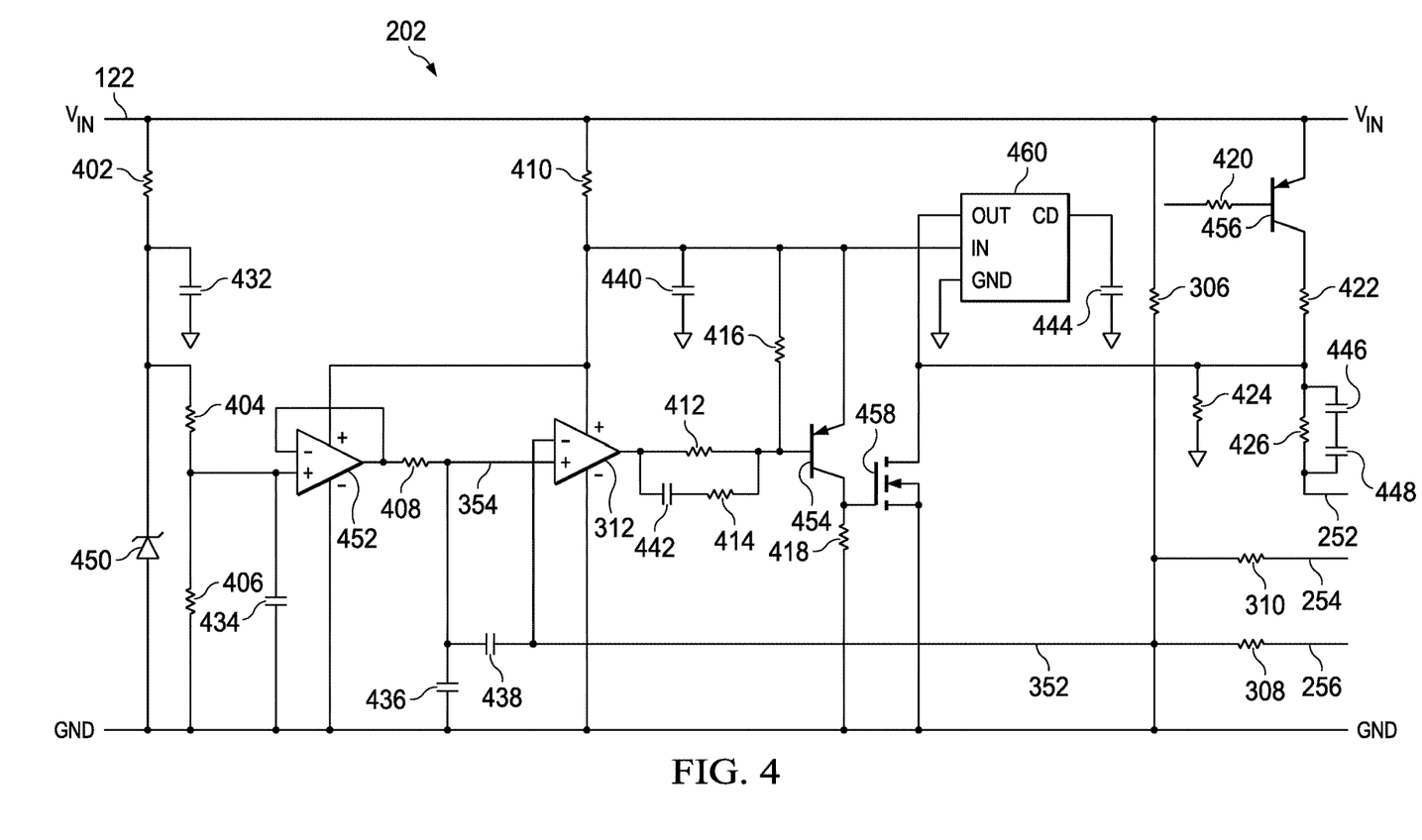
FIG. 4 shows an illustrative circuit diagram of an active limiting circuit in accordance with various embodiments.

FIG. 4 shows an illustrative circuit diagram of active limiting circuit 202 in accordance with various embodiments. The active limiting circuit 202 includes resistors 306-308, 402-426, hysteresis resistor 310, capacitors 432-448, voltage reference 450 (e.g., a temperature compensated precision reference integrated circuit), amplifier 452, comparator 312, transistors 454-458, and under-voltage detector 460. In some embodiments, the transistors 454-456 are PNP BJT transistors, but may be any other type of transistors in alternative embodiments. In some embodiments, the transistor 458 is an NMOS transistor, but may be any other type of transistor in alternative embodiments.

The resistors 308, 310 combined with the capacitor 438 make a low pass filter which may filter the sense voltage 352 to control the reaction time to transient power conditions. In other words, the low pass filter comprising resistors 308, 310 and capacitor 438 may allow for the comparator 312 to compare the sense voltage 352 with the reference voltage 354 so that a LOW gate voltage signal 252 is produced either more quickly or more slowly in the presence of transient signals. For example, the size of the capacitor 438 may determine how quick the reaction will be to a power spike to open one or more of power switches 212-216. Thus, the capacitor 438 may be variable and/or selectable by a user so that the power limiting of the active limiting circuit system 104 is specific to gas groups where the load 108 is located without having to create an additional assembly. Even though different gas groups may have different safety standards with regard to how quick the reaction time to open one or more of the power switches 212-216 needs to be, a single assembly that contains active limiting circuit system 104 may be utilized to meet the standards for each gas group by utilizing a variable and/or selectable capacitor 438.

The amplifier 452 and resistor 408 are part of a reference voltage generation circuit to generate the reference voltage 354. The amplifier may be a unity gain amplifier. The resistor 408, which in some embodiments is a relatively low value such as 100 ohms, limits the current in the reference voltage 354, thus, producing a low power and stiff (i.e., a smooth signal with no or little variance) reference voltage 354.

Figure 5:
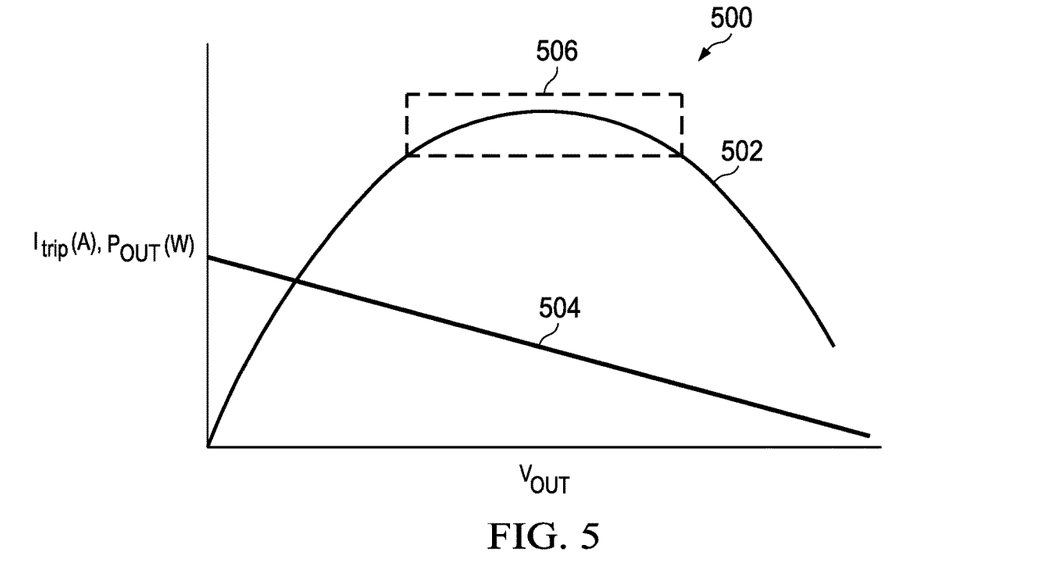
FIG. 5 shows an illustrative graph illustrating output power of a power source with respect to output voltage of the power source in accordance with various embodiments.

FIG. 5 shows an illustrative graph 500 illustrating output power 502 of power providing circuit 106 with respect to output voltage of the power providing circuit 106 in accordance with various embodiments. FIG. 5 additionally illustrates the trip current 504 which will cause one or more of power switches 212-216 to open with respect to output voltage of the power providing circuit 106 in accordance with various embodiments. As shown in FIG. 5, the output power 502 of the power providing circuit 106 is parabolic. However, over the working section 506 of the curve, the output power 502 varies by about 15% which is a large improvement over systems that independently sense voltage and current in the power source 102 output signal 122. Additionally, in contrast to passive limiting circuits in which the trip current is constant causing the power limit to decrease when the supplied voltage decreases (e.g., battery voltages tend to decrease as temperature drops or load increases), as the power source 102 output voltage decreases, the trip current 504 increases. Thus, unlike in conventional systems, as temperature decreases and/or load increases, the power available to the load 108 is always (or at least most of the time) available to power the load 108 even with decreasing temperature and/or load increases.

Figure 6:
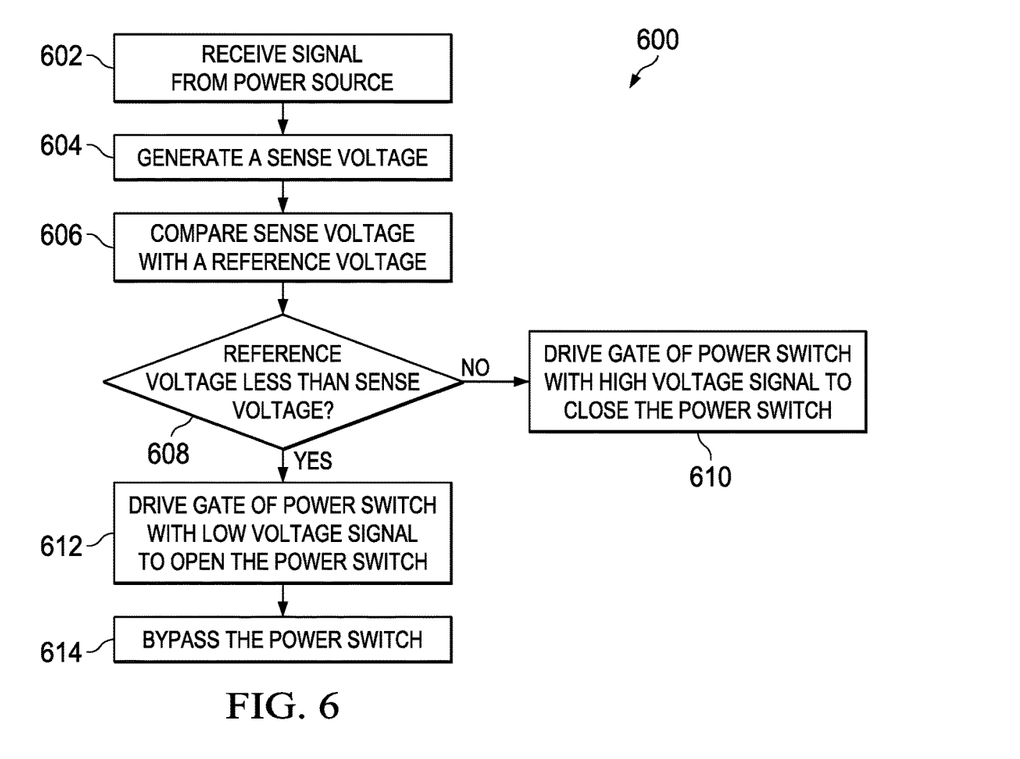
FIG. 6 shows an illustrative flow diagram of a method for limiting power to a load in accordance with various embodiments.

FIG. 6 shows an illustrative flow diagram 600 of a method for limiting power to a load in accordance with various embodiments. Though depicted sequentially as a matter of convenience, at least some of the actions shown can be performed in a different order and/or performed in parallel. Additionally, some embodiments may perform only some of the actions shown. In some embodiments, at least some of the operations of the method 600, as well as other operations described herein, can be performed by the active limiting circuit system 104 (including any of active limiting circuits 202-206, any of power switches 212-216, the sense resistor 208, the bypass resistor 210, the diode 218, and/or the inductor 220)

The method 600 begins in block 602 with receiving a signal from a power source. The signal may have a first power level that is based on an output voltage and an output current in the signal that may be provided to a load. For example, a signal, such as signal 122, may be received from a power source, such as power source 102, by an active limiting circuit, such as any of active limiting circuits 202-206, which then may be provided to a load, such as load 108 as the signal 124.

In block 604, the method 600 continues with generating a sense voltage that is representative of the power level of the output signal. For example, a feedback voltage divider may be configured to generate the sense voltage. The sense voltage may be equal to $\alpha*V_{out}+\beta*I_{out}$, where $\alpha$ is equal to a ratio between a value of a hysteresis resistor, such as hysteresis resistor 310, of the voltage divider in parallel with a value of a first resistor, such as resistor 308, of the voltage divider and the value of the hysteresis resistor in parallel with the value of the first resistor added to the value of a second resistor, such as resistor 306, of the voltage divider, $V_{out}$ is the output voltage in the signal, $\beta$ is a value of a sense resistor, such as sense resistor 208, and $I_{out}$ is the output current in the signal.

The method 600 continues in block 606 with comparing the sense voltage with a reference voltage associated with a desired power output threshold. In an embodiment, the desired power output threshold is based on a type of hazardous atmosphere where a load, such as load 108, is located. For example, a comparator, such as comparator 312, may compare the sense voltage with a reference voltage, such as reference voltage 302. The value of the reference voltage, $\alpha$, and $\beta$ may be based on the desired power output threshold and a range of operation of the power source. In block 608, the method 600 continues with determining whether the reference voltage is less than the sense voltage.

If, in block 608, a determination is made that the reference voltage is not less than the sense voltage, then the method 600 continues in block 610 with driving the gate of a power switch with a HIGH voltage signal to close the power switch allowing the power source to provide the signal to the load at the first power level. For example, the comparator may generate a gate voltage, such as any of gate voltages 252, 262, 272 to drive a HIGH voltage to the gate of a respective power switch, such as any of power switches 212-216. Because the gate voltage is HIGH, the power switch closes and/or remains closed allowing the signal received from the power source to be provided the signal at the first power level to a load.

However, if, in block 608, a determination is made that the reference voltage is not less than the sense voltage, then the method 600 continues in block 612 with driving the gate of a power switch with a LOW voltage signal to open the power switch preventing the power source from providing the signal to the load at the first power level. For example, the comparator may generate a gate voltage, such as any of gate voltages 252, 262, 272 to drive a LOW voltage to the gate of a respective power switch, such as any of power switches 212-216. Because the gate voltage is LOW, the power switch opens and/or remains opened preventing the power source from providing the signal at the first power level to a load.

In block 614, the method 600 continues with bypassing the power switch allowing the power source to provide the signal to the load at a second power level. The second power level is less than the first power level. For example, when the power is open, power may flow from the power source through a bypass resistor that is in parallel with the power switch, such as bypass resistor 210, to provide at least some power to the load. Because the bypass resistor may be a relatively large resistor a relatively large voltage drop of the signal may occur. Therefore, the current, and thus the power that flows through the bypass resistor into the load may be relatively small, and at least less than the first power level provided by the signal.

As discussed above, in conventional intrinsic safety circuitry design, a circuit is limited using "passive" components such as current-limiting resistors, fuses, and Zener diodes. For example, a conventional design may utilize a sense resistor in series with the power supply to limit the available output power to a load. The additional resistance provided by this sense resistor consumes significant power and limits efficiency. For example, such a sense resistor is sized for the maximum supply voltage. At lower supply voltages, the available output power is reduced in proportion to the square of the supply voltage. Therefore, much less power (e.g., up to 70% less power) may be provided as the load voltage goes from, for example, 3.6V to 2.0V. However, an active limiting circuit, such as active limiting circuit 104 utilizes comparatively small series resistance. Furthermore, such an active limiting circuit compensates for load voltage changes to provide nearly constant power (e.g., the output power threshold of such a circuit may vary by +/−15%).

Conventional designs may also utilize a fuse in series with the power supply such that, if the load current exceeds the fuse rating, the fuse will open to limit the output current. A fuse typically has very high initial tolerances, thus, the design of such a conventional system uses the worst case tolerances when calculating available power. Therefore, the real available power may be much lower due to the tolerances. Furthermore, the trip point of a fuse in these conventional designs typically varies with temperature. In contrast, the disclosed active limiting circuit may, in embodiments, utilize precision references and resistors that have very low initial tolerances and that vary little with temperature. With this type of conventional design, certification agencies may de-rate the current limit, further limiting real available power. However, the disclosed active limiting circuit is not a fuse, and therefore, not subject to such rules by the certification agencies. Moreover, fuses only limit current' therefore, if the supply voltage lowers, proportionally less power is provided (e.g., as much as 45% less power as the load voltage goes from 3.6V to 2.0V). In contrast, with the disclosed system, the active limiting circuit may compensate for load voltage changes to provide nearly and/or approximately constant power.

Some conventional designs may use a current limiting circuit that generates a sense voltage that is proportional to the current through the load. This sense voltage is compared to a threshold, and if the sense signal passes the threshold, the load switch is opened. Because the available output power is supply voltage times the load current, if the supply voltage lowers, then this conventional design will provide proportionally less power. In contrast, the disclosed active limiting circuit may compensate for load voltage changes to provide nearly and/or approximately constant power.

Some conventional designs may use a current limiting circuit that uses an analog multiplier to calculate power. A sense voltage proportional to output power may be calculated as load current times the load voltage using an analog multiplier. If a sense voltage passes a threshold, a load switch is opened. Analog multipliers typically consume several mA and typically cannot operate at low supply voltages (e.g., down to 2V). In contrast, the disclosed active limiting circuit may consume μA and may operate at low supply voltages (e.g., 2V).

Some conventional designs may utilize a microcontroller to sample the output current and voltage using one or more analog-to-digital converters (ADCs). The microcontroller then may calculate power as the product of the current and voltage. This product is compared to a threshold, and based on the comparison, the microcontroller may make a decision to open or close a load switch. However, these systems require software that is error free which may be very difficult. In contrast, the disclosed active limiting switch does not require software. Furthermore, in order to achieve fast reaction time in the microprocessor of this conventional design, the current and voltage needs to be sampled at several hundred thousand times per second. Thus, the core of the microprocessor, would thus, need to operate at several MHz. Such a microcontroller consumes several mA. In contrast, the disclosed active limiting circuit may consume μA and achieve fast reaction time via a comparator circuit.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The invention claimed is:

1. An active limiting circuit, comprising:
   a comparator configured to compare a reference voltage with a sense voltage, the sense voltage being dependent on a voltage and a current provided to a load being driven by a battery;
   a power switch configured to be, in response to the reference voltage being less than the sense voltage, in an open state, and in response to the reference voltage being greater than the sense voltage, in a closed state creating a closed circuit between the battery and the load allowing the battery to provide a first amount of power to the load;

a series inductor coupled between the battery and the load, the inductor configured to effectively rate-limit an output current supplied to the load to allow time for the active limiting circuit to enter the open state in a presence of energy transients;

a feedback voltage divider coupled to the battery and the comparator, the feedback voltage divider configured to generate the sense voltage based on a battery output voltage and a battery output current; and a sense resistor coupled in series to the feedback voltage divider;

wherein the feedback voltage divider includes a first resistor coupled to the sense resistor and the comparator, a second resistor coupled to the battery and the comparator, and a hysteresis resistor coupled to the load and the comparator.

2. The active limiting circuit of claim 1, wherein the sense voltage is equal to $\alpha*V_{out}+\beta*I_{out}$, wherein $\alpha$ is equal to a ratio between a value of the hysteresis resistor in parallel, when the switch is in the closed state, with a value of the first resistor and the value of the hysteresis resistor in parallel, when the switch is in the closed state, with the value of the first resistor added to the value of the second resistor, $V_{out}$ is the voltage provided to the load, $\beta$ is a value of the sense resistor, and $I_{out}$ is the battery output current.

3. The active limiting circuit of claim 2, wherein the reference voltage, $\alpha$, and $\beta$ are based on a desired power output threshold and a range of operation for the battery output voltage.

4. The active limiting circuit of claim 3, wherein the desired power output threshold is based on a type of hazardous atmosphere where the load is located.

5. The active limiting circuit of claim 1, wherein:
in response to the reference voltage being greater than the sense voltage, the comparator is further configured to drive a gate of the power switch with a HIGH voltage signal, causing the power switch to be in the closed state; and
in response to the reference voltage being less than the sense voltage:
the comparator is further configured to drive a gate of the power switch with a LOW voltage signal, causing the power switch to be in the open state; and
the hysteresis resistor is configured to provide hysteresis to the power switch such that the power switch stays latched open.

6. The active limiting circuit of claim 1, further comprising a bypass resistor coupled in parallel with the power switch, the bypass resistor configured, in response to the power switch being in the open state, to allow the battery to provide a second amount of power to the load, the second amount of power being less than the first amount of power.

7. The active limiting circuit of claim 1, wherein the power switch is an n-channel metal-oxide semiconductor (NMOS) enhancement type transistor.

8. The active limiting circuit of claim 1, further comprising a diode in parallel with the series inductor.

9. A system comprising:
a power source configured to generate a signal at a first power level based on an output voltage and an output current of the power source;
a load configured to receive the signal;

a first active limiting circuit coupled to the power source and the load, the first active limiting circuit including:
a first comparator configured to compare a first reference voltage with a first sense voltage, the first sense voltage representative of the first power level in the signal generated by the power source;
a feedback voltage divider coupled to the power source and the comparator, the feedback voltage divider configured to generate the first sense voltage based on the output voltage and the output current; and
a sense resistor coupled in series to the feedback voltage divider;
wherein the feedback voltage divider includes a first resistor coupled to the sense resistor and the comparator, a second resistor coupled to the power source and the comparator, and a hysteresis resistor coupled to the load and the comparator; and
a first power switch configured to be, in response to the first reference voltage being less than the first sense voltage, in an open state preventing the power source from providing the signal at the first power level to the load, and in response to the first reference voltage being greater than the first sense voltage, in a closed state creating a closed circuit between the power source and the load allowing the power source to provide the signal at the first power level to the load;
wherein the first active limiting circuit further includes a series inductor coupled between the power source and the load, the inductor configured to effectively rate-limit the output current supplied to the load to allow time for the first power switch to enter the open state in a presence of energy transients.

10. The system of claim 9, wherein the first sense voltage is equal to $\alpha*V_{out}+\beta*I_{out}$, wherein $\alpha$ is equal to a ratio between a value of the hysteresis resistor in parallel, when the power switch is in the closed state, with a value of the first resistor and the value of the hysteresis resistor in parallel, when the power switch is in the closed state, with the value of the first resistor added to the value of the second resistor, $V_{out}$ is the output voltage, $\beta$ is a value of the sense resistor, and $I_{out}$ is the output current.

11. The system of claim 10, wherein the first voltage reference, $\alpha$, and $\beta$ are based on a desired power output threshold and a range of operation for the power source.

12. The system of claim 11, wherein the desired power output threshold is based on a type of hazardous atmosphere where the load is located.

13. The system of claim 11, further comprising:
a second active limiting circuit coupled to the power source and the load, the second active limiting circuit including a second comparator configured to compare a second reference voltage with a second sense voltage, the second sense voltage representative of the first power level in the signal generated by the power source; and
a second power switch configured to be, in response to the second reference voltage being less than the second sense voltage, in an open state, preventing the power source from providing the signal at the first power level to the load, and in response to the second reference voltage being greater than the second sense voltage, in a closed state creating a closed circuit between the power source and the load allowing the power source to provide the signal at the first power level to the load.

14. The system of claim 13, further comprising a bypass resistor coupled in parallel with the first and second power switches, the bypass resistor configured, in response to the first power switch being in the open state or the second power switch being in the open state, to allow the power source to provide the signal at a second power level to the load, the second power level being less than the first power level.

15. The system of claim 9, wherein the active limiting circuit further comprises a diode in parallel with the series inductor.

16. A method for limiting power to a load comprising:
receiving a signal from a power source, the signal having a first power level based on an output voltage and an output current in the signal;
generating, by a feedback voltage divider and a sense resistor coupled in series with the feedback voltage divider, a sense voltage representative of the power level of the signal, wherein the feedback voltage divider includes a first resistor coupled to the sense resistor and a comparator, a second resistor coupled to the power source and the comparator, and a hysteresis resistor coupled to the load and the comparator;
comparing, by the comparator, the sense voltage with a reference voltage associated with a desired power output threshold;
in response to the reference voltage being less than the sense voltage, driving a gate of a power switch with a LOW voltage signal to open the power switch preventing the power source from providing the signal to a load at the first power level;
in response to the reference voltage being greater than the sense voltage, driving the gate of the power switch with a HIGH voltage signal to close the power switch allowing the power source to provide the signal to the load at the first power level; and
rate-limiting the output current utilizing a series inductor between the power source and the load.

17. The method of claim 16, wherein the sense voltage is equal to $\alpha*V_{out}+\beta*I_{out}$, wherein $\alpha$ is equal to a ratio between a value of the hysteresis resistor in parallel, when the power switch is closed, with a value of the first resistor and the value of the hysteresis resistor in parallel, when the power switch is closed, with the value of the first resistor added to the value of the second resistor, $V_{out}$ is the output voltage, $\beta$ is a value of the sense resistor, and $I_{out}$ is the output current.

18. The method of claim 17, wherein the reference voltage, $\alpha$, and $\beta$ are based on a desired power output threshold and a range of operation for the power source.

19. The method of claim 18, wherein the desired power output threshold is based on a type of hazardous atmosphere where the load is located.

20. The method of claim 16, further comprising in response to the power switch opening, bypassing the power switch allowing the power source to provide the signal to the load at a second power level, the second power level being less than the first power level.

* * * * *